United States Patent
Miller

(10) Patent No.: US 9,505,196 B2
(45) Date of Patent: Nov. 29, 2016

(54) LAMINATE FACING FOR FIBER REINFORCED MATERIALS AND COMPOSITE MATERIALS FORMED THEREFROM

(71) Applicant: Thomas Miller, Granville, OH (US)

(72) Inventor: Thomas Miller, Granville, OH (US)

( * ) Notice: Subject to any disclaimer, the term of this patent is extended or adjusted under 35 U.S.C. 154(b) by 475 days.

(21) Appl. No.: 13/851,662

(22) Filed: Mar. 27, 2013

(65) Prior Publication Data
US 2014/0295176 A1    Oct. 2, 2014

Related U.S. Application Data

(60) Provisional application No. 61/616,863, filed on Mar. 28, 2012.

(51) Int. Cl.
*B32B 5/02* (2006.01)
*B32B 5/06* (2006.01)
*B32B 7/04* (2006.01)
(Continued)

(52) U.S. Cl.
CPC ............... *B32B 27/12* (2013.01); *B32B 5/024* (2013.01); *B32B 7/045* (2013.01); *B32B 7/14* (2013.01); *B32B 27/36* (2013.01); *B32B 5/02* (2013.01); *B32B 5/06* (2013.01); *B32B 7/04* (2013.01); *B32B 7/08* (2013.01); *B32B 7/12* (2013.01); *B32B 15/08* (2013.01); *B32B 15/09* (2013.01); *B32B 27/32* (2013.01); *B32B 27/322* (2013.01); *B32B 27/40* (2013.01); *B32B 27/42* (2013.01); *B32B 2255/10* (2013.01); *B32B 2255/205* (2013.01); *B32B 2260/021* (2013.01); *B32B 2260/046* (2013.01); *B32B 2262/0253* (2013.01); *B32B 2262/0276* (2013.01); *B32B 2262/101* (2013.01); *B32B 2305/07* (2013.01); *B32B 2305/073* (2013.01); *B32B 2305/08* (2013.01); *B32B 2323/04* (2013.01); *B32B 2323/10* (2013.01); *B32B 2327/06* (2013.01); *B32B 2367/00* (2013.01); *B32B 2375/00* (2013.01); *B32B 2419/00* (2013.01); *B32B 2607/00* (2013.01); *Y10T 428/23914* (2015.04); *Y10T 428/249923* (2015.04); *Y10T 428/266* (2015.01); *Y10T 428/269* (2015.01); *Y10T 428/27* (2015.01); *Y10T 428/31565* (2015.04); *Y10T 428/31681* (2015.04); *Y10T 428/31786* (2015.04); *Y10T 428/31797* (2015.04); *Y10T 442/2861* (2015.04); *Y10T 442/3862* (2015.04); *Y10T 442/675* (2015.04)

(58) Field of Classification Search
None
See application file for complete search history.

(56) References Cited

U.S. PATENT DOCUMENTS 3,846,524 A * 11/1974 Elmore et al. ............... 264/45.3
3,996,082 A * 12/1976 Leatherman .......... B29C 66/712
156/276

(Continued)

*Primary Examiner* — Vivian Chen

(57) ABSTRACT

The present invention provides a laminate material having a polyester film and a layer of polyester fibers cohesively bonded thereto. Generally, a metal layer deposited at least one surface of the laminate. The invention may also include a glass reinforced polymer layer formed on the laminated facer where the polymer of the glass reinforced polymer layer is commingled with the nonwoven of the laminated facer. The laminate may further include a second polymer layer having a thickness joined to the fiber layer and/or a layer of hot melt adhesive applied to the polyester fibers. Also presented is a composite material having a polyester film, a layer of polyester fibers bonded to the second polymer layer; a second polymer layer joined to the polyester film; and a glass reinforced polymer layer formed on the laminated facer, where the polymer of the glass reinforced polymer layer is commingled with the nonwoven of the laminated facer.

10 Claims, 4 Drawing Sheets

(51) Int. Cl.
*B32B 7/08* (2006.01)
*B32B 7/12* (2006.01)
*B32B 7/14* (2006.01)
*B32B 15/08* (2006.01)
*B32B 15/09* (2006.01)
*B32B 27/12* (2006.01)
*B32B 27/32* (2006.01)
*B32B 27/36* (2006.01)
*B32B 27/40* (2006.01)
*B32B 27/42* (2006.01)

(56) References Cited

U.S. PATENT DOCUMENTS

| | | | |
|---|---|---|---|
| 4,242,406 A * | 12/1980 | El Bouhnini et al. | 442/373 |
| 4,269,884 A * | 5/1981 | DellaVecchia | B29C 47/0047 156/219 |
| 4,419,507 A * | 12/1983 | Sublett | 528/302 |
| 4,468,426 A * | 8/1984 | Hatchadoorian et al. | 428/213 |
| 5,252,397 A * | 10/1993 | Hanzawa et al. | 428/373 |
| 5,298,315 A * | 3/1994 | Fukui et al. | 442/387 |
| 5,445,874 A * | 8/1995 | Shehata | 442/287 |
| 5,509,142 A * | 4/1996 | Connell et al. | 2/79 |
| 5,605,739 A * | 2/1997 | Stokes et al. | 428/198 |
| 5,646,208 A * | 7/1997 | Cattron et al. | 524/128 |
| 5,662,978 A * | 9/1997 | Brown et al. | 428/57 |
| 5,786,064 A * | 7/1998 | Finestone et al. | 428/137 |
| 5,906,704 A * | 5/1999 | Matsuura et al. | 156/331.4 |
| 5,906,879 A * | 5/1999 | Huntoon et al. | 428/136 |
| 6,132,868 A * | 10/2000 | Dean et al. | 428/364 |
| 6,156,682 A * | 12/2000 | Fletemier et al. | 442/394 |
| 6,309,736 B1 * | 10/2001 | McCormack et al. | 428/198 |
| 6,352,948 B1 * | 3/2002 | Pike et al. | 442/384 |
| 6,743,742 B1 * | 6/2004 | LaRocco | B32B 27/12 428/296.7 |
| 6,787,245 B1 * | 9/2004 | Hayes | 428/480 |
| 2001/0004575 A1 * | 6/2001 | Hexels | 442/381 |
| 2002/0106959 A1 * | 8/2002 | Huffines et al. | 442/394 |
| 2003/0134115 A1 * | 7/2003 | Goda et al. | 428/361 |
| 2004/0188027 A1 * | 9/2004 | LaRocco et al. | 156/424 |
| 2005/0171250 A1 * | 8/2005 | Hayes | 524/47 |
| 2006/0194496 A1 * | 8/2006 | Burns et al. | 442/381 |
| 2006/0213137 A1 * | 9/2006 | Barney et al. | 52/309.1 |
| 2006/0240242 A1 * | 10/2006 | Raghavendran et al. | 428/304.4 |
| 2007/0190882 A1 * | 8/2007 | Yu et al. | 442/232 |
| 2008/0248241 A1 * | 10/2008 | Kalkanoglu | B32B 11/10 428/141 |
| 2010/0236492 A1 * | 9/2010 | Calabrese | 119/437 |
| 2012/0082838 A1 * | 4/2012 | Fan et al. | 428/221 |

* cited by examiner

LAMINATE FACING FOR FIBER REINFORCED MATERIALS AND COMPOSITE MATERIALS FORMED THEREFROM

PRIORITY

This Application is a Continuation-In-Part of U.S. Provisional Application Ser. No. 61/616,863, filed Mar. 28, 20012, entitled, "Laminate Facing for Fiber Reinforced Materials and Composite Materials Formed Therefrom" with Inventor: Thomas Miller. All aspects of Provisional Application Ser. No. 61/616,863 are hereby incorporated by reference.

BACKGROUND

Polypropylene films are often used as surface materials for laminates and composite materials and are known for use in lining trucks and refrigerated shipping containers. Typically, the polypropylene film is bonded to a nonwoven. The polypropylene face layer is not a suitably durable, temperature resistant or chemically inert surface. The polypropylene facers are generally not suitable for use with a thermoset composite due to adherence issues and temperature resistance. Polypropylene is typically porous and difficult to clean and is therefore generally not suitable for use for a number of applications. The polypropylene laminate is formed with a film of polypropylene, to which a layer of polypropylene is extruded and the extruded polypropylene adheres to the film and the nonwoven material. The three-step process increases material costs, processing expense and material waste.

SUMMARY

In accordance with embodiments, the present invention relates to laminate facings for fiber reinforced or composite materials and materials formed therefrom. The laminate facings are generally formed of a polyester film layer bonded directly to a nonwoven fibrous layer. The facings are cohesively bonded to a nonwoven, typically roll bonded, point bonded or bonded any other suitable method, including coforming of the fiber layer on the film or the film layer on the fibrous layer directly such that the fibers and the polyester film facing are integrally joined without the use of an intermediate layer of adhesive or other polymer. The composite materials may be formed by applying the laminate to a surface and depositing fiber reinforced resin to the laminate or applying the laminate to the surface of a fiber-reinforced resin during manufacture. The laminate provides a rugged outer layer for composite materials and may reduce volatile organic compound emissions by replacing a gel coat layer. The laminate may also include a metalized layer such as aluminum, molybdenum, tantalum, titanium, nickel, and tungsten. The metalized layer improves thermal properties by forming a radiant barrier and also improves opacity of the facing and provides an aesthetically pleasing appearance.

In accordance with embodiments of the present invention the films may be produced by conventional forming such as casting, blowing, and extrusion or coextrusion processes. The extruded films are created with a single layer made from an extrudable thermoplastic polymer and may include one or more exterior layers. One suitable exterior layer includes a relatively low melting point heat sealable polymer to improve the bonding of the film to the fibrous layer. The bonding material of the film is a heat sealable polymer layer designed to melt bond to the polymer of the fiber layer. In an alternate embodiment of the present invention, a metal layer deposited on one surface or both surfaces of the laminate.

In accordance with an alternate embodiment of the present invention is presented having a composite material of a laminated facer having a polyester film with a thickness of 0.5-5 mil and a layer of polyester fibers having a density of 17-100 GSM bonded thereto; and a glass reinforced polymer layer formed on the laminated facer where the polymer of the glass reinforced polymer layer is commingled with the nonwoven of the laminated facer.

In accordance with an alternate embodiment of the present invention is presented having a laminate material having a polyester film having a thickness of 0.5-2 mil, a layer of polyester fibers having a density of 17-70 GSM bonded to the polyester film and a second polymer layer having a thickness of 0.5-5.5 mil joined to the polyester fibers.

In accordance with an alternate embodiment of the present invention is presented having a composite material having a polyester film having a thickness of 0.5-2 mil, a layer of polyester fibers having a density of 17-70 GSM bonded to the film, a second polymer layer having a thickness of 0.5-5.5 mil joined to the polyester fibers and a glass reinforced polymer layer formed on the laminated facer.

BRIEF DESCRIPTION OF THE DRAWINGS

A more complete appreciation of the invention and the many embodiments thereof will be readily obtained as the same becomes better understood by reference to the following detailed description when considered in connection with the accompanying drawings, wherein.

DETAILED DESCRIPTION

Figure 1A:
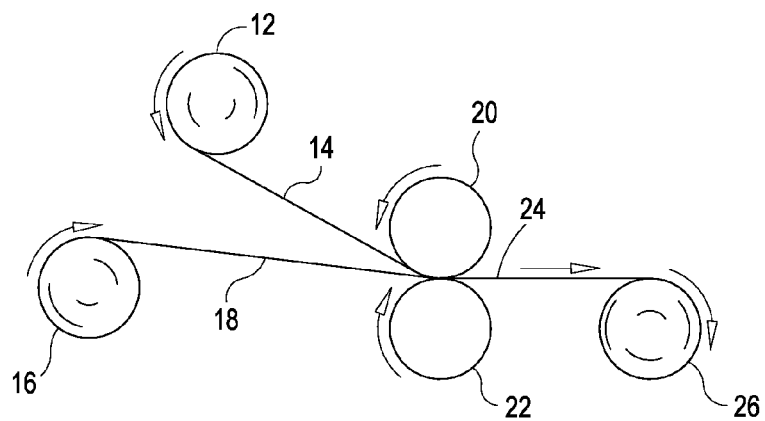
FIG. 1A illustrates a plan view of the formation of the laminate material in accordance with one aspect of the present invention.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about". Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Fibrous nonwoven webs provide an improved bonding surface between a polymer film layer and a fiber reinforced polymer composite material. Nonwoven webs may be formed from a number of processes including, spunbond, or meltblown. Meltblown fibers are formed by extruding molten thermoplastic material through a plurality of fine, usually circular, die capillaries as molten threads or filaments into a high velocity gas stream to attenuate the fibers. Spunbond fibers are formed by extruding a molten thermoplastic material from capillaries in a spinneret and being reducing the diameter by mechanical or fluid-drawing.

The web may be bonded to improve mechanical properties. Many bonding methods are available including powder bonding using a powdered adhesive added to the web and then typically heated. Another bonding method is point or pattern bonding using heated calender rolls or ultrasonic bonding equipment to bond the fibers together. Point bonding provides for a secure bonding of the nonwoven to the polyester film while leaving unbonded fibers available to commingle with the composite laminate or other coating resin. Roll bonding may be used to bond the web across its entire surface. Bicomponent staple fibers may be used in the process as well.

As seen in FIG. 1A, roll 16 of polymer film 18 and roll 12 of nonwoven 14 is laminated by calender rolls 20, 22. The resulting laminate 24 is taken up roll 26. The polymer film is preferably 0.5-5.0 mil thick. A polyester film such as polyethylene terephthalate sold under the trade names Mylar, Skyrol, Melinex or Hostaphan may be used. Generally, the bonding temperature is 130-180° C. Preferably, a temperature of about 140-170° C. is be used in the bonding process. The fibers and the polyester film facing are cohesively bound, that is, integrally joined without the use of an intermediate layer of adhesive or other polymer. Optionally, a peel ply, such as a 1 mil PET ply may also be included on the polymer film layer to protect the surface. As shown in TABLE 1, a layer of polypropylene or another polymer or a lower grade of polyester may be applied to the nonwoven. The use of lower cost polymers may substantially decrease the overall cost of the material without substantially altering the properties.

Figure 1B:
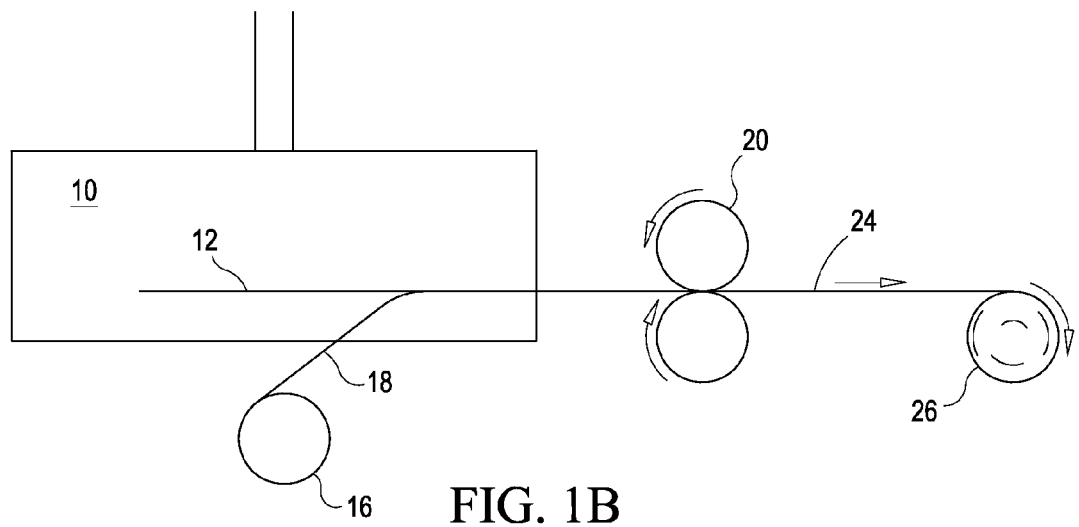
FIG. 1B illustrates a plan view of the formation of the laminate material in accordance with another aspect of the present invention.

In FIG. 1B, the polymer film 18 in taken off roll and fed into nonwoven fiber deposition device 10 such that nonwoven 12 is applied to film 18 and the nonwoven 12 and film 18 are laminated by calender rolls 20, 22. The resulting laminate 24 is taken up roll 26.

Figure 2A:
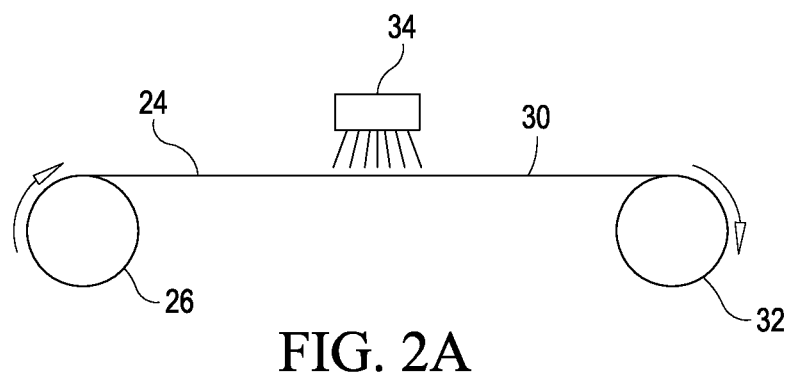
FIG. 2A illustrates a plan view of the printing of the laminate material in accordance with one aspect of the present invention.

FIG. 2A shows the printing process in which laminate 24 is unrolled from roll 26 fed through a printing device to form a printed laminate 30 that is rolled onto take-up roll 32.

Figure 2B:
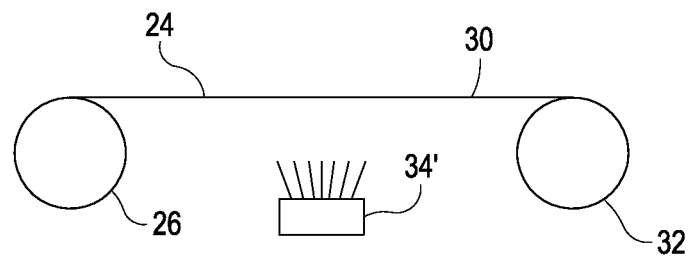
FIG. 2B illustrates a plan view of the metallization of the laminate material in accordance with one aspect of the present invention.

FIG. 2B shows the vapor deposition of metallic compounds in which laminate 24 is unrolled from roll 26 fed through a deposition device to form a metalized laminate 30 which is rolled onto take-up roll 32. Various deposition methods may be used including chemical vapor deposition, physical vapor deposition. Metals such as molybdenum, tantalum, titanium, nickel, and tungsten are generally applied by CVD. For the deposition of aluminum, CVD may be used with tri-isobutyl aluminum, tri ethyl/methyl aluminum, or dimethyl aluminum hydride precursors or a physical deposition process may be used. Electrostatic spray assisted vapor deposition, plasma and electron-beam deposition may also be used. The metalized layer may be formed on either the polyester film layer or the non-woven layer. It may also be advantageous to deposit a metallic coating on both sides of the laminate for improved coverage, durability, and aesthetics.

Figure 3:
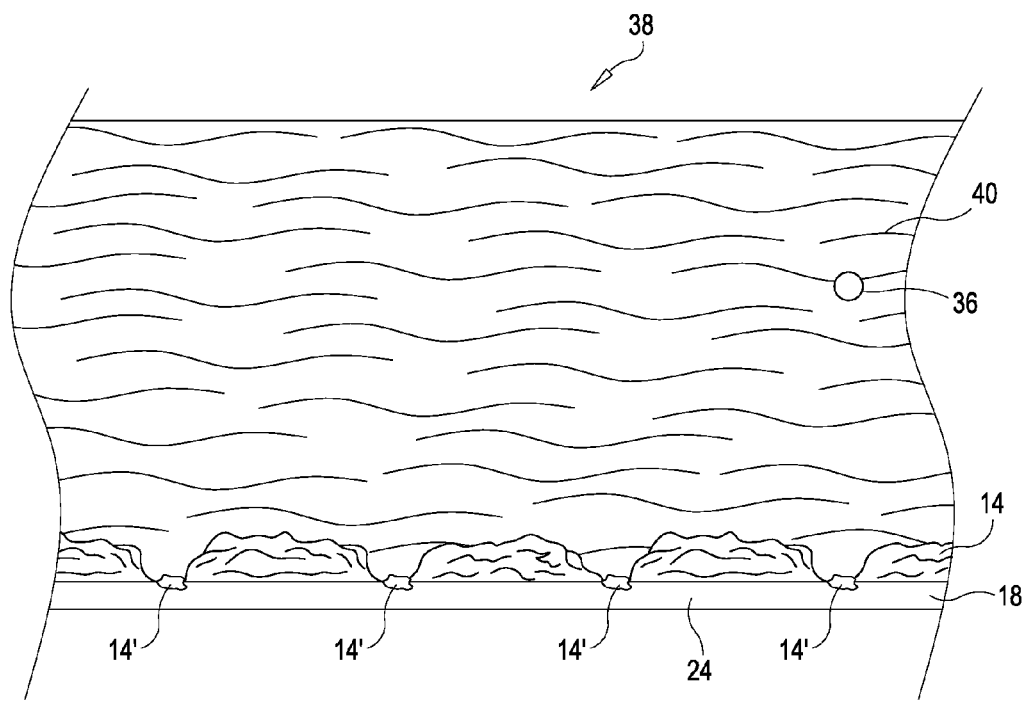
FIG. 3 illustrates a plan view of the composite material of the present invention with a laminate layer and a non-woven included.

FIG. 3 shows a composite material 38 including a resin layer 36 including fibers 40 and laminate 24. Laminate 24 includes polymer film layer 18 bonded to nonwoven 14. The resin 36 infuses into the fibers of the nonwoven layer to provide an integrated mechanical bond. The mechanical bond formed between the resin 36 and the fibers of nonwoven layer 14 is substantially stronger than the chemical bond formed between the resin and the surface of the polymer layer 18. Any resin infusion technology, such as liquid molding, resin transfer molding, vacuum assisted resin transfer molding, vacuum infusion processing and composite infusion molding processing as well as vacuum bag molding, open molding, press molding, may be used to form composite member 38. Other processes such as hot calendering of the laminate onto the resin layer or use of the laminate as a surface film in pulltrusion may be used to form composite member 38.

Figure 4A:
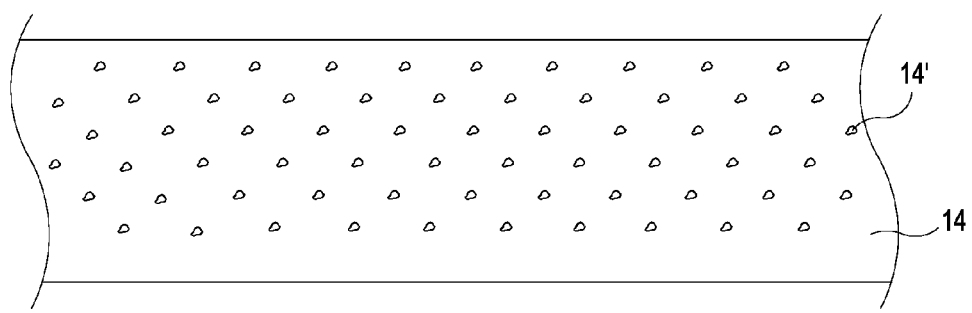
FIG. 4A is a schematic top view of the laminate of the present invention
Figure 4B:
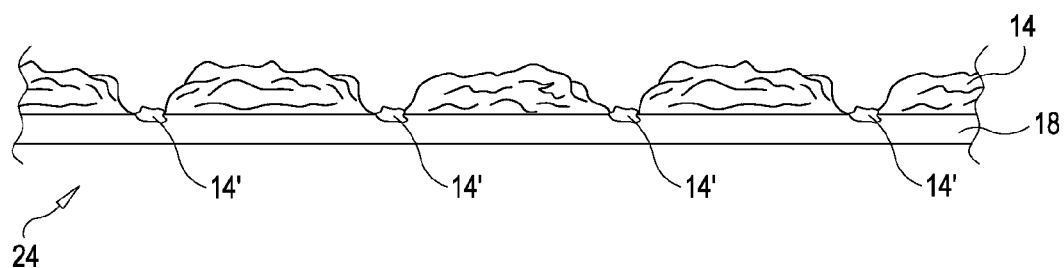
FIG. 4B is a schematic cross sectional view of the laminate of the present invention.

FIG. 4A and FIG. 4B show the point bonded laminate of the present invention including a non-woven layer 14 positioned on poly film 18. The point bonding sites 14' are formed by rollers 20, 22 (as shown in FIG. 1). The point bond sites 14' are substantially compressed such that the polymer of the fibers in the nonwoven 14 is integrally joined with the polymer of the film 18. One or both of the rollers 20, 22 may be heated to melt the fibers of film 14 although it is possible to meld the fibers using pressure alone.

Figure 5:
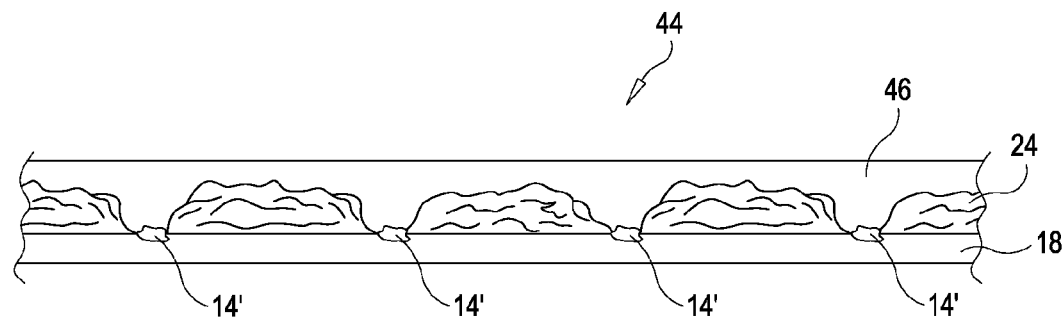
FIG. 5 is a schematic cross sectional view of another laminate of the present invention including an adhesive layer or filler layer applied to the nonwoven layer

FIG. 5 shows another embodiment of the laminate 44 including a polymer film 18, a fibrous layer 24 and a polymer layer 46 applied to the nonwoven layer with bonding sites 14' bonding film 18 to fibers 24. The laminate may be formed as described above to form a laminate material having a polyester film having a thickness of 0.5-2 mil; a layer of polyester fibers having a density of 17-70 GSM bonded polyester film and a polymer layer of polyester, polyurethane, polypropylene, polyethylene, polyurea and polyvinyl chloride. A second polymer 46 may also be a hot melt adhesive applied to the fibers. The hotmelt adhesives may be any known including Ethylene-vinyl acetate (EVA) copolymers, Ethylene-acrylate copolymers such as ethylene n-butyl acrylate (EnBA), ethylene-acrylic acid (EAA) and ethylene-ethyl acetate (EEA), Polyolefins such as low or high density polyethylene, atactic polypropylene, polybutene-1, and oxidized polyethylene, Polybutene-1 and its copolymers, Amorphous polyolefin polymers, Polyamides and polyesters, Polyurethanes, Thermoplastic polyurethane, reactive urethanes, Styrene block copolymers such as Styrene-butadiene-styrene such as Styrene-isoprene-styrene, Styrene-ethylene/butylene-styrene, and Styrene-ethylene/propylene. Other hotmelt adhesives may include Polycaprolactone Polycarbonates, Fluoropolymers, Silicone rubbers, Thermoplastic elastomers and Polypyrrole may also be used.

The laminate and composite material of the present invention is suitable for use in any composite structures including truck and trailer liners, refrigerated shipping container liners, ladder rails, tool handles, window lineals, structural materials, wall panels for use in food preparation, health care or sanitary applications, wall panels for recreational vehicles, polls and cross arms, pilings or other infrastructure applications, and signage; or electronic materials such as substrates for electronic boards, laminates for solar panels, integrated circuits, industrial switching, capacitors, and electrical boards; and insulation such as foam facers, glass or mineral wool facers, and radiant heat barriers.

EXAMPLES

Generally, polyester layers are combined with nonwoven layers a wide range of potential laminates is shown in TABLE 1. As shown the face of the polymer film is metalized as shown in trials 5 and 6. The polyester film used in each trial was 20 microns; however, any number of films are suitable. The spunbond nonwoven ranges from 34-65 GSM. The nonwoven is metalized in trials 4 and 6. The metallization of the fibers provides a dull metallic look that is protected from wear in the final composite material. The PP/Glass composite fiber is 50% glass fibers and 50% polypropylene fibers. The polypropylene layer is applied at 108 GSM (~3.5 mils thick). The use of a second polymer layer improves the strength of the final bond to the composite board, improving the shear strength from 175 PSI to 235 PSI.

The present invention should not be considered limited to the specific examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. A composite material comprising:
  a laminate surface material having:
    a heat sealable polyester film having a thickness of 0.5-5 mil,
    a layer of polyester fibers having a density of 17-100 GSM cohesively bonded directly thereto
  a fiber reinforced board having:
    a resin layer including reinforcing fibers,
    the resin layer infused into the fibers of the layer of polyester fibers to provide an integrated mechanical bond between the reinforced board and the laminate surface material.

2. The composite material of claim 1, wherein the cohesive bond is selected from the group consisting of melt bonding, point bonding and roll bonding, with the use of a powdered binder on the fibers.

3. The composite material of claim 1, wherein the cohesive bond is selected from the group consisting of melt bonding, point bonding and roll bonding, without the use of a secondary binder.

4. The composite material of claim 1, further comprising:
  a metal layer deposited on at least one surface of the laminate surface material.

5. The composite material of claim 1, wherein the polyester film has a thickness of 0.5-3.0 MIL.

6. The composite material of claim 1, wherein the polyester film has a thickness of 0.5-3.0 MIL and the layer of polyester fibers has a density of 30-65 GSM.

7. The composite material of claim 1, wherein the polyester film has a thickness of 0.5-1.5 MIL and the layer of polyester fibers has a density of 17-35 GSM.

8. The composite material of claim 1, further comprising:
  a powdered hotmelt adhesive applied to and commingled with the polyester fibers.

9. The composite material of claim 1, further comprising:
  an adhesive layer having a thickness of 30-260 GSM joined to the layer of polyester fibers.

10. The composite material of claim 9, wherein the adhesive layer is selected from the group consisting of polyethylene, polyester, polyurethane, polypropylene, polyurea or polyvinyl chloride.

TABLE 1

| Layer | unit | 1 | 2 | 3 | 4 | 5 | 6 | 7 |
|---|---|---|---|---|---|---|---|---|
| Metalized Film | Microns | 20 | 20 | 20 | 20 | Y 20 | Y 20 | 20 |
| Spunbond | GSM | 65 | 34 | 34 | 34 | 34 | 34 | 34 |
| Metalized | | | | | Y | | Y | |
| PP Coating | GSM | | | 108 | | | | |
| Composite | PP/Glass % | 50/50 | 50/50 | 50/50 | 50/50 | 50/50 | 50/50 | 50/50 |
| Shear Strength | PSI | | | 235 | | | | 175 |